July 17, 1923.
C. BUTTERFIELD
1,461,966
MACHINE FOR MAKING PAPER FOLDING BOXES AND THE LIKE
Filed March 23, 1922
5 Sheets-Sheet 1
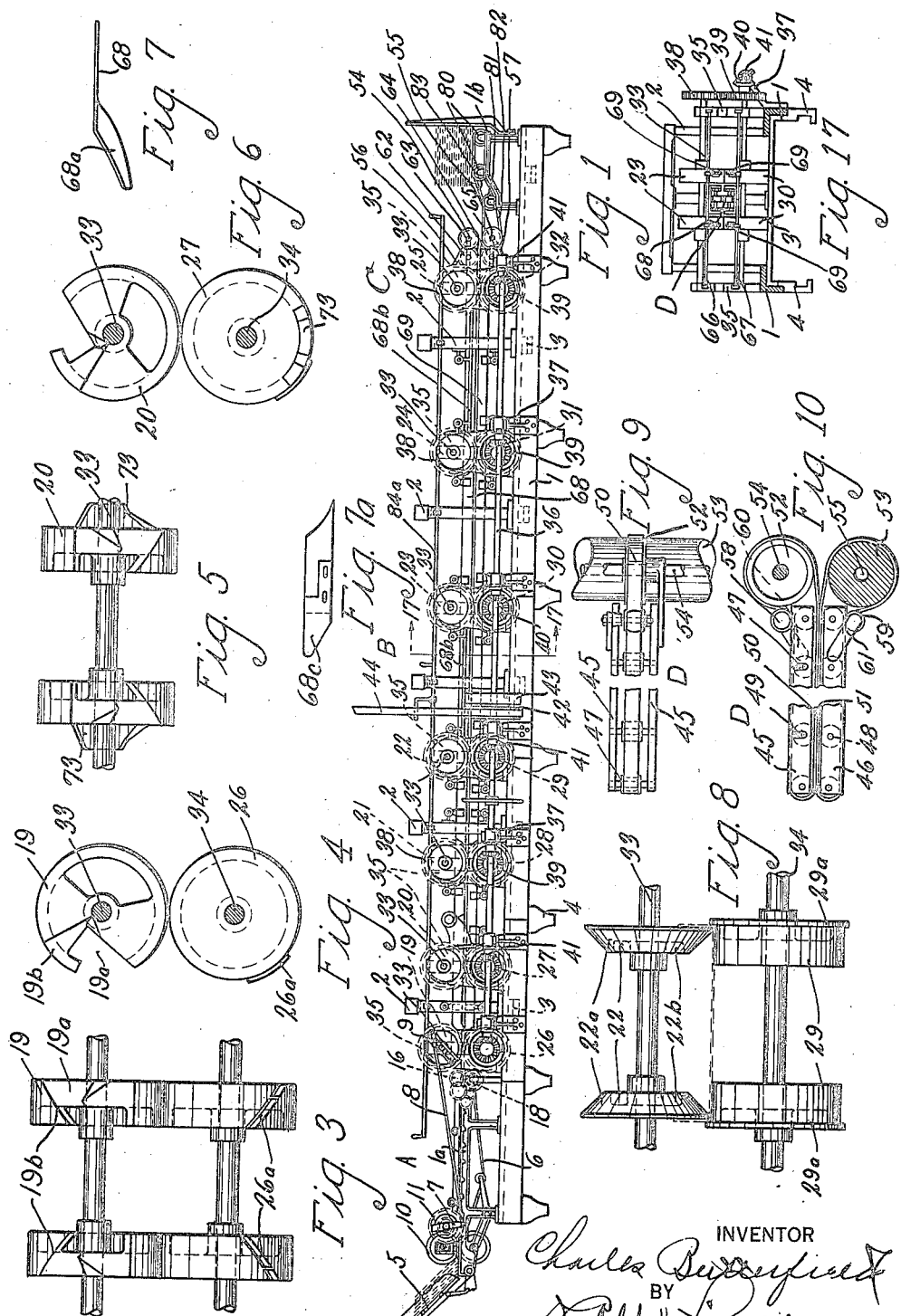
INVENTOR
Charles Butterfield
BY
ATTORNEY

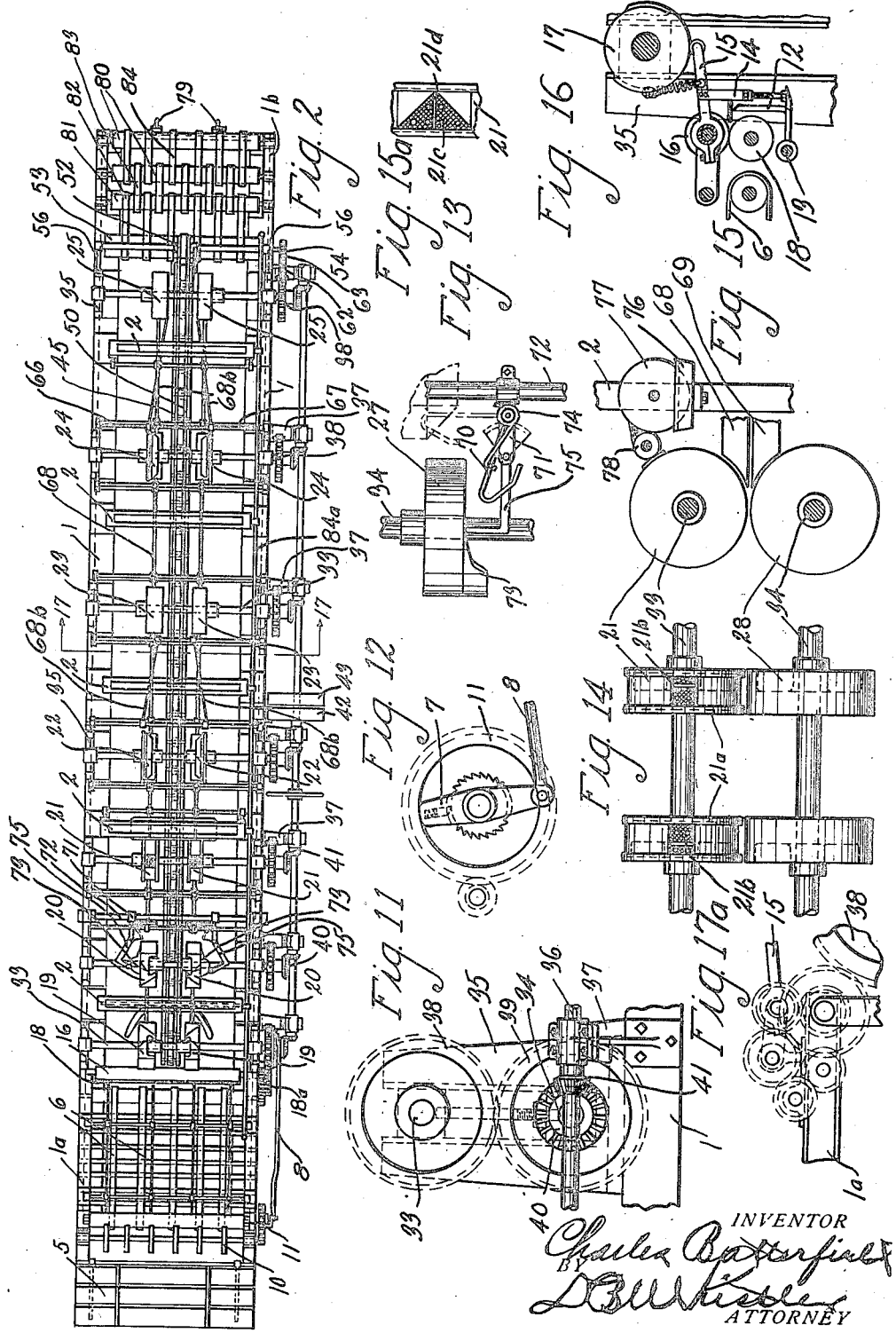

July 17, 1923.

C. BUTTERFIELD 1,461,966

MACHINE FOR MAKING PAPER FOLDING BOXES AND THE LIKE

Filed March 23, 1922       5 Sheets-Sheet 4

INVENTOR
Charles Butterfield
BY
ATTORNEY

July 17, 1923.

C. BUTTERFIELD 1,461,966

MACHINE FOR MAKING PAPER FOLDING BOXES AND THE LIKE

Filed March 23, 1922     5 Sheets-Sheet 5

INVENTOR
Charles Butterfield
BY
ATTORNEY

Patented July 17, 1923.

1,461,966

UNITED STATES PATENT OFFICE.

CHARLES BUTTERFIELD, OF MIDDLETOWN, OHIO, ASSIGNOR TO THE INTERSTATE FOLDING BOX COMPANY, OF MIDDLETOWN, OHIO.

MACHINE FOR MAKING PAPER FOLDING BOXES AND THE LIKE.

Application filed March 23, 1922. Serial No. 546,044.

To all whom it may concern:

Be it known that I, CHARLES BUTTERFIELD, a citizen of the United States, residing at Middletown, in the county of Butler and State of Ohio, have invented certain new and useful Improvements in Machines for Making Paper Folding Boxes and the like, of which the following is a specification, reference being had therein to the accompanying drawings.

This invention relates to a new machine for making paper folding boxes.

The main object of my invention is to provide a machine of this character adapted for large output of folding boxes of variable types and sizes, and in which all required operations for producing the different units of the boxes are automatic, thus eliminating hand operations and, accordingly, cheapening production.

In the particular form herein illustrated and described, the machine is adapted to produce paper folding boxes in which various coacting parts are united one with another by means of a suitable adhesive, as glue cement, paste, etc., the application of the adhesive and uniting of the parts being effected automatically coincident with the folding operations on the machine.

Certain forms of blanks of box making material are also herein shown and described, but it will be understood that this is merely for the purpose of illustrating the practice of the invention, as various modifications can obviously be made in the general organization and operation of the machine to adapt the same to variations in the product to be produced thereon, without departing from the underlying principles of the invention as defined and comprehended in the appended claims.

In the accompanying drawings:

Fig. 1 is a side elevation of the paper folding box machine illustrating the general organization thereof;

Fig. 2 is a plan view of the machine;

Fig. 3 is front elevation of the first unit of the box folding mechanism;

Fig. 4 is a side elevation of Fig. 3;

Fig. 5 is a plan view of the second unit of the box folding mechanism;

Fig. 6 is a side elevation of Fig. 5;

Fig. 7 is a view of a detail feature of the first unit of a series of guides for the paper blanks;

Figure 18:
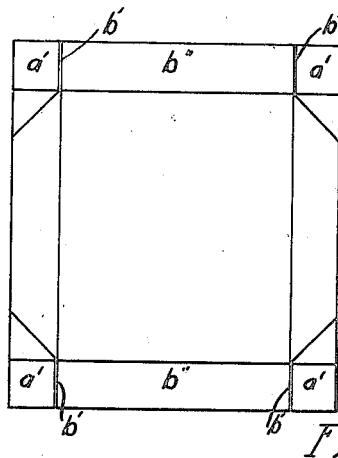
Figure 19:
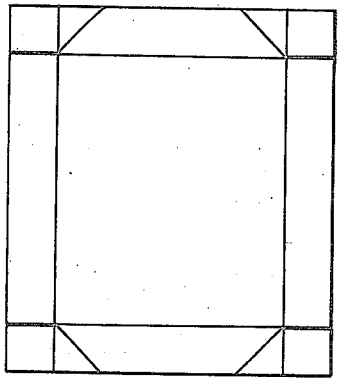
Figure 24:
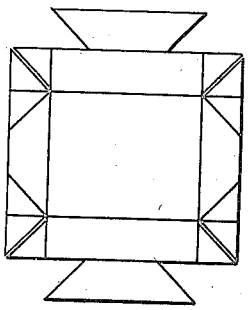
Figure 25:
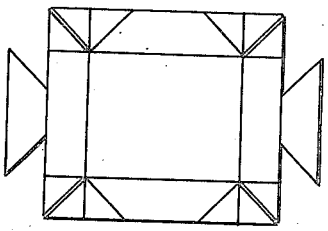

Fig. 7ᵃ is a view of a detail of the blank carrier guides;

Fig. 8 is front elevation of the fourth unit of the box folding mechanism;

Fig. 9 is a plan view of a detail of the paper blank carrier mechanism;

Fig. 10 is a side view of Fig. 9;

Fig. 11 is a detail side elevation of the second unit of the box folding mechanism including the gear drive for the same;

Fig. 12 is a side view of a detail feature of the automatic paper blank-feeding mechanism;

Fig. 13 is a plan view of a detail feature of the box folding mechanism;

Fig. 14 is a front elevation of the adhesive applying mechanism;

Fig. 15 is a side elevation of the mechanism illustrated in Fig. 14, including the adhesive supply tank;

Fig. 15ᵃ is a view illustrating a modification of the adhesive applying mechanism;

Fig. 16 is a side elevation of a detail of the feeding mechanism;

Fig. 17 is a cross sectional view of the machine taken on the line 17—17 of Fig. 1;

Fig. 17ᵃ is a detail of a gear train of the feeding mechanism;

Figs. 18 and 19 illustrate paper blanks for the top and bottom of a common type of folding box, adapted for production on the machine herein illustrated;

Figs. 20 to 23 illustrate successive steps of folding the blanks shown in Figs. 18 and 19;

Figs. 24 and 25 illustrate paper blanks for the top and bottom of a special type of paper folding box adapted for production on the machine.

Figs. 26 to 31 illustrate successive steps of folding the blanks shown in Figs. 24 and 25.

Figure 32:
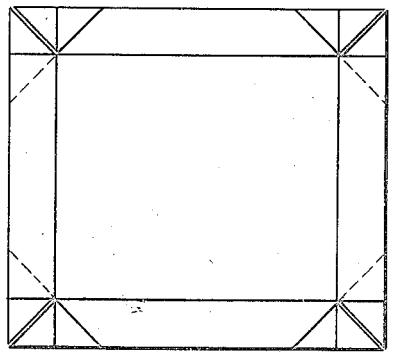
Figure 33:
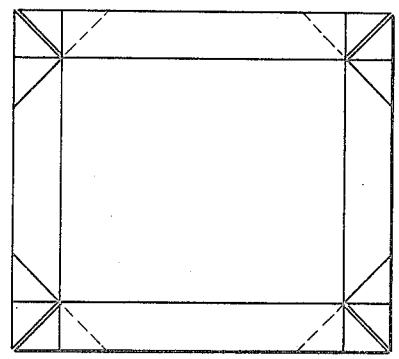
Figure 34:
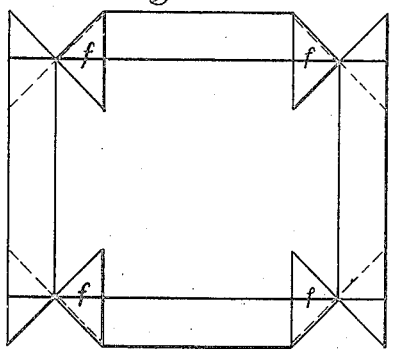
Figure 35:
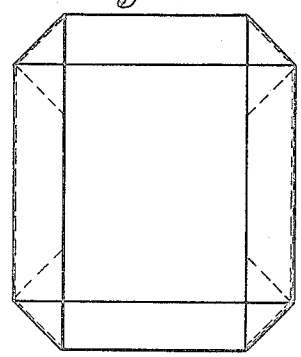
Figure 36:
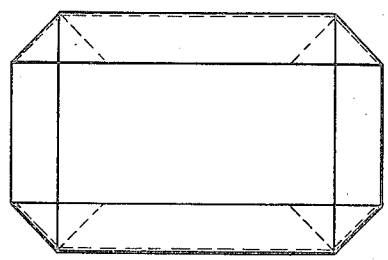

Figs. 32 and 33 illustrate blanks for the top and bottom of a third type of folding box, and Figs. 34 to 36 illustrate the construction of the third type of box.

The complete apparatus for making folding boxes in the practice of my invention, as here shown in a preferred form in Figs. —1 and —2, comprises three units or groups of mechanisms,—the blank feeding mechanism —A, the box-folding mechanism —B, and the box delivering mechanism —C,—the different mechanisms being coordinated one with another to operate as a single automatic machine.

The apparatus as a whole is supported on a suitable frame structure comprising opposite parallel frame members —1, secured one to the other by a series of upwardly extended truss frames —2 and under frame —3, the frame structure as a whole being supported on legs —4.

The blank feeding mechanism —A, as here shown, except as to certain detail features thereof, is of well known construction in this art, and is not described in detail, therefore, nor claimed specifically, except as to the novel details referred to, but is claimed in the broad combinations defining the machine as a whole. As shown, the feeder mechanism is supported on a frame —1—ª and consists of an inclined table —5 upon which the blanks for making the folding boxes are stacked in suitable quantities to meet the requirements of the automatic feeding mechanism.

The novel features of the automatic feeding mechanism, as here shown, consists of a step-by-step pick-up mechanism which acts to deliver the paper blanks singly from table —5 to the carrier belts —6, the latter being of the usual well known construction. The step-by-step mechanism consists of a ratchet gear drive —7, illustrated in detail in Fig. 12, which is adjustably connected to the gear mechanism of the first unit of the box folding mechanism as at —9 by a pitman —8, and to the pick-up rollers —10 by a gear —11, —the pick-up rollers being, as here shown, of the usual type of rubber-covered friction rollers commonly used in feeding mechanisms of this character.

A further novel feature of the feeding mechanism consists of an automatic timing mechanism for delivery of the paper blanks to the folding mechanism,—this feature being illustrated in detail Fig. 16, consisting of a series of automatic stops —12 secured to a transverse shaft —13, and controlled by upwardly extended arms —14 connected to inclined arms —15 which are secured at one end to the shaft of the upper delivery roller —16, and are in engagement at their opposite ends with cams —17 secured to the shafts of the upper rollers of the first folding unit,— thus the action of the cam on roller —16 will be to lift the roller —18, and at the same time to raise the stops —12 into the path of the paper blank in position thereon to be delivered,—the purpose of this arrangement being described in connection with the operation of the machine as a whole. As best illustrated in detail Fig. 17—ª, the feeding mechanism is connected to the first unit of the folding mechanism by spur gears in a manner to synchronize the operation of the feeding mechanism, and the folding mechanism.

The box folding mechanism —B comprises a double series of vertically opposite rollers,—each series being made up of upper rollers 19, 20, 21, 22, 23, 24, and 25, and lower rollers 26, 27, 28, 29, 30, 31 and 32,—each unit of the series comprising two upper and two lower rollers supported respectively on upper shafts —33 and lower shafts —34, which are adjustably supported in bearings —35 extending upwardly from the frames —1, as best illustrated in detail Fig. 11,—the shafts being operatively connected to a main drive shaft —36 which is supported on one of the frames —1 in bearing brackets —37 by intermeshing spur gears 38—39 secured to the upper and lower roller shafts 33—34, and bevel gears —40 and —41, secured respectively to lower roller shafts —34 and drive shaft —36,—the drive shaft being connected as, here shown, to any suitable source of power by means of fast and loose pulleys —42 and —43 and a belt —44,—thus upon the application of power to the machine all the rollers —19 to —25 and —26 to —32 inclusive, will be operated simultaneously at equal speeds.

A box blank carrier —D extends longitudinally between frames —1, in a horizontal plane intermediate the upper and lower box folding rollers, the full length of unit —B of the machine, and consists of horizontally and vertically opposite upper and lower parallel frames —45 and —46 spaced one from the other as best illustrated in detail Figs. 9 and 10 of the drawings; a series of upper and lower transverse guide rollers —47 and —48 supported in frames —45 and —46 respectively,—the upper rollers, except the one at the extreme left, as viewed in Figs. 1 and 2, being yieldably supported by any suitable means, as spring pressure bearings —49; opposite traveling belts —50 and —51 operable between frames —45 and —46 and over rollers —47 and —48,—the frames acting as guides for the belts, and upper tension rollers —47 acting to keep the belts in yieldable contact one with the other in their intermediate travel between the rollers; and belt driver rollers —52 and —53 for the upper and lower belts, respectively, secured to shafts —54 and —55 supported in extension brackets —56 and —57 secured to opposite bearing brackets —35,—idler rollers —58 and —59 supported in pivot arms —60 and —61 secured to frames —45 and —46, being, employed, as here shown, to keep the upper and lower belts taut,—operative movement being transmitted to belt driver rollers —52 and —53, respectively, by means of upper and lower gear trains —38 —62 —63 and 39— 64— and —65. Between each set of upper and lower rollers —19 —25 and —26 —32 and secured to transverse rods —66 and —67, respectively, are upper and lower guide —68 and —69,—the guides being arranged parallel with, in the horizontal plane of, and spaced vertically one from the other substantially as the carrier frames —45 and —46 —the guides acting to support the opposite edges of the paper blanks as the same are engaged and moved through the machine by the carrier belts —50 and —51. The first set of upper guides —68 at the feed end of the machine are flared outwardly, as illustrated at —68—$^a$ in detail Fig. 7 for a purpose which will presently be described in connection with the operation of the machine.

The first set of folding rollers —19 —26 are shown in detail in Figs. 3 and 4, the upper rollers —19 having clearance spaces 19—$^a$ formed therein to provide for the first folding operation of the paper blanks as the same pass between the rollers, and the lower rollers —26 having diagonally arranged flanges —26—$^a$ secured to the peripheries thereof which act in conjunction with the diagonal edge —19—$^b$ of roller —19 to grip the paper blanks, as the same are delivered one by one by the feeding mechanism —A, and to effect the first folding operation at one end of the blank as the same pass between the rollers.

The second set of folding rollers —20 —27 are similar to the first set of rollers and perform a similar operation, but in the inverse order, at the opposite end of the blank.

Between the second and third sets of rollers, as best shown in detail Fig. 13, are opposite mechanisms each comprising a horizontally extended arm —70 supported in brackets —71 secured to a transversely supported rod —72 and operatively connected to cams —73 arranged on the outer faces of rollers —27 by means of intermediate gears —74 and segment levers —75 which are also pivoted in brackets —71 and having their opposite ends engaged with the cams and acting, as actuated thereby, to rotate arm —70 through the arc of a circle,—the function of the arm being presently described relative to the operation of the machine.

In the third set of rollers, the lower rollers —28 have symmetrical, or unbroken peripheral surfaces,—the upper rollers —21 having opposite peripheral flanges —21—$^a$—, pads —21—$^b$, being arranged on the rollers between the flanges, as best shown in detail Fig. 14, and adapted to apply to certain coacting surfaces of the paper blanks, as will presently be described, an adhesive substance, as glue, paste, or cement,—supplied to the pads —21—$^b$ from a tank —76 by means of a supply roller —77 adapted to be partially immersed in the adhesive material in the tank, and a distributing roller —78 adapted to spread the adhesive on the pads —21—$^b$,—thus to cause portions of the blank to firmly adhere one to another as the same are subsequently brought under pressure in a further step of the folding operation.

In the fourth set of rollers, as best shown in detail Fig. 8, the lower rollers —29 have peripheral edge flanges —29—$^a$, and the upper rollers —22 have the greater portions of their peripheral surfaces beveled inwardly as at —22—$^a$,—the outer edges —22—$^b$ being arranged to extend over and coact with the inner edges of flanges —29—$^a$ to effect a further step in the folding of the paper as it passes therebetween.

In the fifth set of rollers, both the upper rollers —23 and lower rollers —30 have unbroken peripheral surfaces which coact one with the other to complete the folding operation initiated by rollers —22 —29,—the action upon the fold between the rollers being with sufficient pressure to cause the surfaces supplied with adhesive to firmly adhere to corresponding surfaces with which the same are brought into contact by action of pressure rollers —23 —30.

The sixth set of rollers —24 —31 is similar in construction and operation to the fourth set and perform a similar folding operation upon the paper blank.

The seventh set of rollers —25 —32 is similar to the fifth set and effects a similar operation on the paper blanks as the same pass therebetween to the delivery mechanism —C.

The timing of the mechanism of the folding units of the machine can readily be adapted for folding paper of variable widths by disconnecting bevel gear —41 from bevel gear —40 of the second unit of the folding rollers —20 and —27, and rotating the rollers in the required direction to provide for an earlier or later pick-up of the paper blank by the second folding unit, accordingly, as the case may be, for longer or shorter blanks. For this purpose, the adhesive pads are also adjustable peripherally on rollers —21, and all the rollers —19 —25 and —26 —32 inclusive, and guides —68 and —69 are adjustable laterally in both directions to adapt the same to paper blanks of variable size. Also it will be obvious to those experienced in this art, that foldings of variable character can be performed on the paper blanks by modifying details of the general arrangement without departing from the underlying principles of the invention.

The delivery mechanism —C may be of any suitable construction. As here shown, this unit of the apparatus consists of a well known type of mechanism, comprising a frame —1—$^b$ supported on the frames —1 and having upwardly extended stops —79. Horizontally opposite rollers —80 and a roller —81 in a lower horizontal plane are supported in frame —1—ᵇ, and are traversed by carrier belts —82 —83, and —84, — belts —82 being connected to the lower roller —53 of the carrier mechanism —D, belts —83 traversing the first roller —80 and roller —81, and belts —84 traversing rollers —80. As shown in Fig. 1, the inner edge of the stacked folded boxes overhangs the inclined travel of belts —83 between roller —81 and the first roller —80, —thus causing the boxes as delivered from the folding mechanism to be delivered beneath the stack and permitting the boxes to be handled in quantities as removed from the machine.

A belt shifter rod —84—ᵃ is mounted on truss frames —2 and extended the full length of the folding unit of the machine, —thus affording convenient control of the machine for the attendant operator.

Three types of paper folding boxes adapted for production in the practice of my invention are illustrated in the drawings,—a common type of box being illustrated in Figs. 18 to 23 and special types of boxes in Figs. 24 to 31, and Figs. 32 to 36 respectively,—these blanks serving merely to illustrate the adaptability of the principle of my invention to the production of folding boxes of variable forms.

The paper blanks illustrated in Figs. 18 and 19 are, respectively, for the top and bottom of the box, the blanks being scored and slotted for folding. The folding operations on the blanks for the tops and the blanks for the bottoms are substantially identical, except that on one blank the folds are made at opposite ends of the blank, and on the other blank at opposite sides of the blank,—this being effected by introducing the blanks in one case, for the top of the box, endwise, and the blanks for the bottom of the box sidewise, into the folding mechanism—the opposite foldings of the top and bottom blanks being for the purpose of effecting symmetrical construction of the sides and ends of the complete box as assembled.

Figure 20:
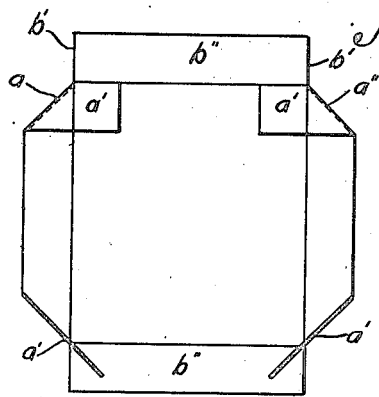
Figure 21:
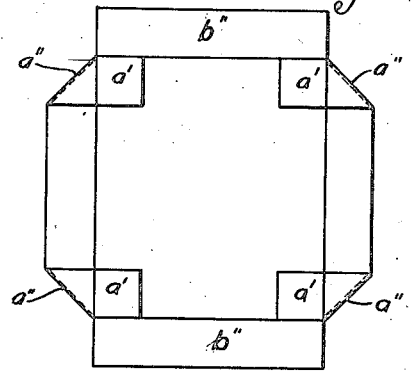
Figure 22:
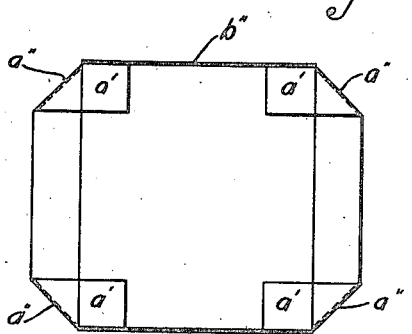
Figure 23:
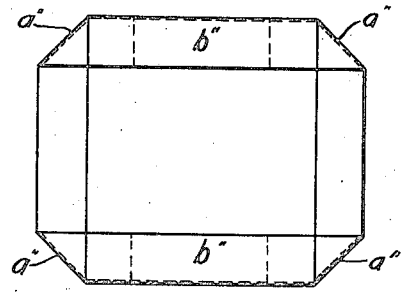

The folding operations on blanks shown in Fig. 18, are illustrated in Figs. 20 to 23,—the successive operations being as follows: The blanks are stacked on table —5 of the automatic feeding mechanism, as illustrated in Fig. 1, in suitable quantities to effect proper delivery of the blanks, one at a time, to the folding mechanism. As the blanks are moved sidewise on carrier belts —6, they are stopped and aligned by stops —12, roller —16 being then in raised position. Upon lowering of the roller into feeding relation with lower roller —18, the blank will be advanced with its forward edge in a position to be engaged between the upper and lower rollers —19 and —26, respectively, of the first unit of the folding mechanism, the movement of the blank relative to the movement of the rollers being so timed that the diagonal flanges —26—ᵃ on lower roller —26 will cooperate with diagonal edges —19—ᵇ of upper roller —19 in a manner to effect folding of portions —a' on lines —a'' of the blank substantially at right angles to the face of the blank,—the ends of the blank having previously been slotted on lines —b'; the folds —a' being further acted upon as the blanks pass from the first to the second rollers by the curved portions —68—ᵃ to flatten the folds over the face of the blanks as indicated in Fig. 20. A corresponding right-angle fold of portions —a' is made at the opposite end of the blank as the same passes between the second unit of rollers —20 and —27,—the folds being in the inverse order, as indicated in Fig. 20. As the blanks pass from the second to the third unit of rollers, the inverse folds —a' are acted upon by arms —70 to flatten the folds to the face of the blanks as indicated in Fig. 21. The square surfaces only of folds —a', as indicated by score lines, are supplied with adhesive as the blanks pass between the rollers of the third unit. Portions b'' are turned up at right-angles to the face of the blanks, as indicated in Fig. 22 as the blanks pass between rollers —21 and —28 fourth unit,—this action on the paper being effected, as illustrated in Fig. 8, between the peripheral flanges of the lower rollers and the outer faces of the upper rollers. The final fold of the blanks, as illustrated in Fig. 23, is made as the blanks pass between rollers —22 and —29 of the fifth unit,—this final action being made with sufficient pressure to cause the adhesive surfaces of portions a' to be firmly joined to the corresponding opposite surfaces of portions b''.

The sixth and seventh sets of rollers, as here shown, are not required for producing boxes of the type above described,—these additional units being here shown to illustrate the practice of my invention in the production of the type of folding box illustrated in Figs. 24 to 30. For boxes not requiring the extra folding rollers, the same can be removed from the machine, or can be shifted laterally out of the path of the paper blanks as the same are moved through the machine on the carrier belts,—thus there will be no interference with the normal operation of the machine whether or not all the folding units are in operation.

The folding operations of the type of box illustrated in Figs. 24 to 30 are similar to those illustrated and described relative to Figs. 18 to 23, but are somewhat more complex. In this form, also, opposite side and end foldings are made of the blanks for the tops and the blanks for the bottoms, to effect symmetrical construction and uniform strength of the boxes as assembled one unit with the other. Detail description of the folding operation, as applied to one blank, however, will also suffice for the other, as the operations on both are the same—the only difference being that one blank passes endwise and the other blank sidewise through the machine.

Figure 26:
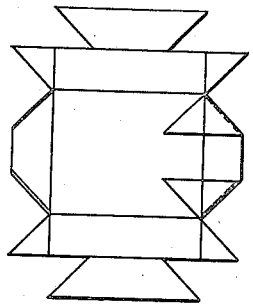
Figure 27:
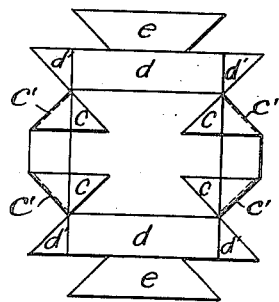
Figure 28:
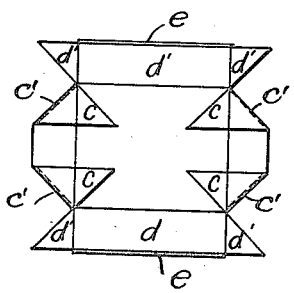
Figure 29:
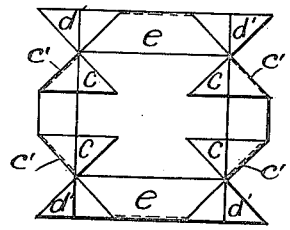
Figure 30:
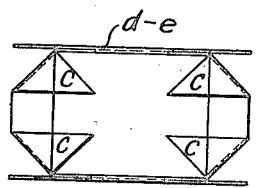
Figure 31:
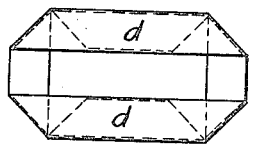

The blanks for boxes of this character consist, as here shown in Figs. 24 and 25, of integral units, cut, slotted and scored for folding. The form of blank shown in Fig. 24 passes through the folding mechanism sidewise,—the portions —c at the forward end of the blank being turned-up on lines —c' at right-angles to the face of the blank by the action of the first set of rollers, and flattened to the face of the blank, as illustrated in Fig. 26 by pressure exerted thereon by guides —68$^a$; the second set of rollers and arms —70 acting cooperatively to make a similar fold of the corresponding portions —c at the opposite end of the blank, as illustrated in Fig. 27; adhesive being applied to the entire surfaces of the portions —d and —d' as the blanks pass the third set of rollers; the fourth set of rollers acting to turn-up portions —e at both ends at right-angles to the face of the blank, as illustrated in Fig. 28,—the portions —e being pressed down and joined to the adhesive surface of portions —d, as indicated in Fig. 29, by the fifth set of rollers,—portions —d and —e being then turned-up at right angles, as indicated in Fig. 30, as the blanks are acted upon by the sixth set of rollers,—the final fold being made, as indicated in Fig. 31, by the action of the seventh set of rollers,—it being observed that portions —d' have adhesive applied thereto, and that adhesive junctures will accordingly be made in the final fold of the paper with the corresponding opposite portions —c. From the seventh unit of folding rollers the finished box units pass to the delivery mechanism —C and are then manually removed from the machine.

A third type of box adapted for production in the practice of my invention is illustrated in Figs. 32 to 36. In this form the paper blanks for the top and bottom of the box are also arranged, preferably for opposite foldings, as illustrated in Figs. 32 and 33. The successive foldings of the opposite blanks being substantially the same, a description of one will serve for both. The first and second steps of folding are illustrated in Fig. 3,—these operations being formed by the first and second units of folding rollers and their cooperating mechanisms—guides —68 and arms —70—in the manner described in connection with the boxes illustrated in Figs. —18 —23 and —24 —31. The adhesive is applied to the blanks on portions —f following the foldings illustrated in Fig. —34,—the final fold of the blank for the bottom of the box being illustrated in Fig. 35, and of the blank for the top of the box in Fig. 36.

It will be observed that all the units for the different types of boxes are delivered from the machine with all junctures made, and folded in complete knock-down form ready for handling and shipping in quantity lots.

Reference is here made to certain detail features and refinements of construction, not heretofore mentioned herein. Between the fourth and fifth sets of rollers —22 —29 and —23 —30—additional guides —68—$^b$ are arranged to engage the right-angle folds of the paper blanks, as illustrated in Figs. 22, 28 and 30, and corresponding right-angle folds preceding the final foldings illustrated in Figs. 35 and 36, and deflect the folds downwardly sufficiently to present the blanks properly to the next following rollers for final foldings. The guides —68—$^b$ being angularly arranged rods, varied as to angularity and spacing one from another to meet the requirements of the size of the blanks.

A further detail feature of the guides —68 is illustrated in detail Fig. 7—$^a$,—this modification consisting of an arrangement for adjusting a section —68—$^c$ of the guides longitudinally to adapt the same to paper blanks of variable sizes and variable foldings as the same are presented to the third set of rollers to receive an application of adhesive therefrom. The action of guides —68—$^c$ would follow, by way of illustration, the right-angle folds represented in Fig. 20 and corresponding folds on other of the blanks following the action thereon by arms —70,—thus the folds as effected by arms —70 are brought under control of guides —68—$^c$ before the paper blanks are engaged by the adhesive supplying rollers.

A further detail feature of the adhesive mechanism is illustrated in detail Fig. —15—$^a$, consisting of a slot —21—$^d$ arranged in the adhesive pad —21—$^c$,—the pad here shown being of the type required in making the third form of folding box illustrated. The purpose of slot —21—$^d$ is to prevent adhesive being applied to the paper blanks on lines where the corner folds occur,—thus serving to avoid breaking of the adhesive surfaces and to effect a better corner construction.

From the foregoing detailed description, the principles and the varied practice of my invention will readily be understood by those experienced in this art. It will be seen that the invention will be effective for producing paper folding boxes of various types, of the best construction, at low cost of time and labor, and without material waste of stock, and that the box units as made are folded in knock-down form ready for handling and shipping in quantity lots without further operations thereon.

Having described my invention, I claim:

1. A machine of the character described, including in combination, a paper blank feeding mechanism, and a series of folding mechanisms arranged in units to effect successive folding operations on the blanks as the same are delivered from the blank feeding mechanism, and including means to move the blanks from one unit to another of said mechanism, one of said units comprising coacting rollers timed to receive the blanks singly from said feeding mechanism, and having a coacting projection and depression thereon respectively to effect the initial fold on an edge of each blank.

2. A machine of the character described, including in combination, a paper blank feeding mechanism, and a series of folding mechanisms arranged in units to effect successive folding operations on the blanks as the same are delivered from the blank feeding mechanism, and including means to move the blanks from one unit to another of said mechanism, one of said units comprising coacting rollers arranged to receive the blanks singly from said feeding mechanism, and having means, comprising a coacting flange and depression arranged on the peripheries of the respective rollers, to effect the initial fold on an edge of each blank.

3. A machine of the character described, including in combination, a paper blank feeding mechanism, and a series of folding mechanisms arranged in units to effect successive folding operations on the blanks as the same are delivered from the blank feeding mechanism, and including means to move the blanks from one unit to another of said mechanism, said series of mechanisms comprising a set of rollers adapted to receive the blanks from the feeding mechanism and to effect an initial fold on an edge of each blank, and a set of rollers acting to receive the blanks from the first named rollers and having means thereon to effect a corresponding fold on the opposite edge of each blank.

4. A machine of the character described, including in combination, a paper blank feeding mechanism, and a series of folding mechanisms arranged in units to effect successive folding operations on the blanks as the same are delivered from the blank feeding mechanism, and including means to move the blanks from one unit to another of said mechanism, said series of mechanisms comprising a set of rollers adapted to receive the blanks from the feeding mechanism and to effect an initial fold on the edge of each blank, and a set of rollers acting to receive the blanks from the first-named rollers and having means thereon, comprising a coacting flange and depression, to effect a corresponding fold on the opposite edge of said blanks.

5. A machine of the character described, including in combination, a paper blank feeding mechanism, and a series of folding mechanisms arranged in units to effect successive folding operations on the blanks as the same are delivered from the blank feeding mechanism, and including means to move the blanks from one unit to another of said mechanism, said series of mechanisms comprising first and second sets of rollers coacting one with the other to fold opposite edges of each blank as received from the feeding mechanism, and a third set of rollers having means adapted to engage said blanks and simultaneously to effect folding of the other opposite edges thereof.

6. A machine of the character described, including in combination, a paper blank feeding mechanism, and a series of folding mechanisms arranged in units to effect successive folding operations on the blanks as the same are delivered from the blank feeding mechanism, and including means to move the blanks from one unit to another of said mechanism, said series of mechanisms comprising first and second sets of rollers coacting one with the other to fold opposite edges of each blank as received from the feeding mechanism, and a third set of rollers having means adapted to engage said blanks and simultaneously to effect folding of the other opposite edges thereof, and a set of rollers intermediate the second and third sets of rollers having means coacting therewith to apply an adhesive to predetermined portions of the blanks whereby upon the last named folding operation adhesive junctures are formed between folded portions of said blanks.

7. A machine of the character described, including in combination, a series of folding mechanisms arranged in units to effect successive folding operations on blanks for making folding boxes, operation of all of said units being coordinated one with another through a common actuator, one of the units consisting of opposite sets of rollers each having a plurality of single rollers spaced one from another on a common actuating shaft and coacting with a roller of the opposite set to receive said blanks therebetween and comprising coacting projections and depressions arranged on the peripheries of the respective rollers to effect a folding operation on an edge thereof.

8. A machine of the character described, including in combination, a series of folding mechanisms arranged in units to effect successive folding operations on blanks for making folding boxes, operation of all of said units being coordinated one with another through a common actuator, one of the units consisting of opposite sets of rollers each having a plurality of single rollers spaced one from another on a common actuating shaft, each having a projection coacting with a depression of a roller of the opposite set whereby the opposite coacting rollers act simultaneously on opposite side edges of each blank to effect a folding operation thereon.

9. A machine of the character described, including in combination, a series of folding mechanisms arranged in units to effect successive folding operations on blanks for making folding boxes, operation of all of said units being coordinated one with another through a common actuator, said series of mechanisms comprising a plurality of sets of rollers including a first and second set acting progressively upon each paper blank to effect a fold on the front and rear edges thereof, and another set of rollers acting subsequently on the opposite side edges of each blank, to effect simultaneously folding operations thereon, and means for moving the blanks from one set of rollers to another.

10. A machine of the character described, including in combination, a series of folding mechanisms arranged in units to effect successive folding operations on blanks for making folding boxes, operation of all of said units being coordinated one with another through a common actuator, said series of mechanisms comprising a plurality of sets of rollers including a first and second set acting progressively upon each paper blank to effect a fold on the front and rear edges thereof, a third set of rollers acting upon the blanks to apply an adhesive to portions thereof, and a fourth set of rollers acting upon the blanks in a later operation to effect simultaneously foldings of the opposite side edges thereof and to form adhesive junctures between folded portions of the blanks, and means for moving the blanks from one set of rollers to another.

11. A machine of the character described, including in combination, a paper blank folding mechanism comprising a blank pick-up mechanism and blank aligning mechanism, a series of folding mechanisms arranged to effect successive folding operations on said blanks, and including a set of rollers coordinated with said feeding mechanism to receive the blanks singly therefrom and comprising coacting folding elements arranged peripherally of said rollers and acting subsequently to effect an initial fold thereon.

12. A machine of the character described, including in combination, a paper blank feeding mechanism comprising automatic stops for aligning said blanks, a series of folding mechanisms arranged to effect successive folding operations on said blanks, and including a set of rollers coacting with said stops to receive the blanks singly from said feeding mechanism and acting to effect an initial fold thereof.

13. A machine of the character described, including in combination, a series of folding mechanisms arranged in units and adapted to effect successive folding operations on paper blanks for making folding boxes, each unit of said mechanisms comprising opposite sets of single rollers including folding elements arranged peripherally on each roller mounted on a common operating shaft and adapted to be spaced variably thereon to adapt said mechanisms for folding blanks of different sizes.

14. A machine of the character described, including in combination, a series of folding mechanisms arranged in units and adapted to effect successive folding operations on paper blanks for making folding boxes, units of said mechanisms comprising a plurality of single rollers adapted to be adjusted rotatably and axially for blanks of variable dimensions, and comprising coacting elements arranged peripherally of the rollers and acting on the blanks to effect folding operations thereon.

15. A machine of the character described, including in combination with a paper blank feeding mechanism, a plurality of mechanisms arranged in series adapted to effect successive foldings of said blank, including a container for an adhesive, and a roller coacting therewith and having an adhesive distributor adjustable circumferentially thereon and adapted to apply the adhesive to predetermined portions of said blank, and means to cause the surfaces supplied with adhesive to be firmly joined to surfaces of the blank brought into contact therewith.

16. A machine of the character described, including in combination with a paper blank feeding mechanism, a plurality of mechanisms arranged in series adapted to effect successive foldings of said blank, including a container for an adhesive, and means coacting therewith and adjustable to apply and limit the application of the adhesive to predetermined portions of said blank, and means to cause the surfaces supplied with adhesive to be firmly joined to surfaces of the blank brought into contact therewith.

17. A machine of the character described, including in combination with a paper blank feeding mechanism, a plurality of mechanisms arranged in series adapted to effect successive foldings of said blank, a unit of rollers coacting to initiate a fold on one edge of said blank, a second unit of rollers coacting to initiate a corresponding fold on the opposite edge of said blank, means between the first and second units of rollers acting to complete said first fold, and means following the second unit of rollers acting to complete said second fold.

18. A machine of the character described, including in combination with a paper-blank feeding mechanism, a plurality of mechanisms arranged in series, adapted to effect successive foldings of portions of said blank, a unit of rollers coacting to receive said blank from said feeding mechanism and to initiate a folding operation on one edge thereof, a second unit of rollers coacting to receive the blank from said first unit and to initiate a corresponding folding operation on the opposite edge thereof, means between said first and second units and operable independently thereof to complete the first folding operation and means following said second unit and operatively connected thereto to complete the second folding operation.

19. A machine of the character described, including in combination with a paper blank feeding mechanism, a plurality of mechanisms arranged in series adapted to effect successive foldings of portions of said blank, a unit of rollers coacting to receive the blank from said feeding mechanism and to initiate a folding operation on one edge thereof, a second unit of rollers coacting to receive the blank from said first unit and to initiate a corresponding folding operation on the opposite edge thereof, folding means fixed between the first and second units acting to complete said first operation and means following the second unit comprising a pivotal arm acting to complete said second operation.

20. A machine of the character described, including in combination with automatic paper blank feeding mechanism, adapted to deliver said blanks singly synchronously, an automatic paper blank folding mechanism coordinated with said feeding mechanism, comprising a series of operable units, including a unit of coacting rollers consisting of opposite lower rollers each having a peripheral flange inwardly adjacent the outer face thereof, and opposite upper rollers each having an outer straight face and inner beveled face both acting with the cooperating flange of the lower roller to initiate a fold of said blank, blank carrier mechanism interposed between said units.

21. A machine of the character described, including in combination with automatic paper blank feeding mechanism, adapted to deliver said blanks singly synchronously, an automatic paper blank folding mechanism coordinated with said feeding mechanism, comprising a series of operable units, including a unit of coacting rollers consisting of opposite lower rollers each having a peripheral flange inwardly adjacent the outer face thereof, and opposite upper rollers, each having an outer straight face and inner beveled face both acting with the cooperating flange of the lower roller to initiate a fold of said blank, and a second unit of upper and lower rollers having corresponding peripheral surfaces on said blank to complete said fold.

22. A machine of the character described, including in combination with a paper blank feeding mechanism, a plurality of coacting mechanisms arranged in series, adapted to effect various foldings of the blanks, means for applying adhesive to portions of said blanks and means to prevent application of adhesive to certain portions of the blanks on folding lines thereof, and means to move the blanks relative to said mechanisms.

23. A machine of the character described, including in combination with a paper blank feeding mechanism, a plurality of coacting mechanisms arranged in series, adapted to effect various foldings of the blanks, means for applying adhesive to portions of said blanks and means to prevent application of adhesive to certain portions of the blanks on folding lines thereof, and means comprising an endless carrier to move the blanks relative to said mechanisms.

24. A machine of the character described, including in combination with a paper blank feeding mechanism, a plurality of coacting mechanisms arranged in series, adapted to effect various foldings of the blanks, means for applying adhesive to portions of said blanks and means to prevent application of adhesive to certain portions of the blanks on folding lines thereof, and means comprising opposite coacting endless carriers to move the blanks singly in progressive order relative to said mechanisms.

In testimony whereof, I affix my signature.

CHARLES BUTTERFIELD.